(12) United States Patent
Dubey et al.

(10) Patent No.: US 10,389,463 B2
(45) Date of Patent: Aug. 20, 2019

(54) SYNCHRONIZATION OF ROUTING INFORMATION IN AN EDGE SYSTEM CLUSTER

(71) Applicant: Nicira, Inc., Palo Alto, CA (US)

(72) Inventors: Ankur Dubey, San Jose, CA (US); Sreeram Ravinoothala, San Jose, CA (US); Ronghua Zhang, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 10 days.

(21) Appl. No.: 15/584,206

(22) Filed: May 2, 2017

(65) Prior Publication Data

US 2018/0323891 A1    Nov. 8, 2018

(51) Int. Cl.
*H04J 3/16* (2006.01)
*H04L 29/08* (2006.01)
(Continued)

(52) U.S. Cl.
CPC ........ *H04J 3/1617* (2013.01); *H04L 67/1095* (2013.01); *H04L 67/14* (2013.01);
(Continued)

(58) Field of Classification Search
CPC .... H04J 3/1617; H04L 61/1517; H04L 12/28; H04L 12/56; H04L 12/66; H04L 29/12339; H04L 45/00; H04L 45/58; H04L 45/60; H04L 45/74; H04L 49/70; H04L 61/6068; H04L 67/00; H04L 43/0847; H04L 45/18; H04L 45/20; H04L 63/1441; H04L 12/46; H04L 12/755; H04L 12/707; H04L 12/715; H04L 45/021; H04L 45/64; H04L 45/22; H04L 12/4662; H04L 67/1008; H04L 67/1006; H04L 67/1002; H04L 12/741; H04L 12/713; H04L 12/931; H04L 49/25; H04L 67/327; H04L 43/106; H04L 49/3009; H04L 4/3063; H04L 49/9068; H04L 45/586; H04L 49/354; H04L 45/02; H04L 45/42; H04L 45/44; H04L 41/0654; H04L 45/122; H04L 61/2585; H04L 41/145; H04L 43/08; H04L 69/326; H04L 69/329; H04L 47/19; H04L 67/1038;
(Continued)

(56) References Cited

U.S. PATENT DOCUMENTS

| 2002/0080798 A1* | 6/2002 | Hariguchi | H04L 45/00 370/395.31 |
| 2013/0013809 A1* | 1/2013 | Vasseur | H04L 45/64 709/239 |

(Continued)

*Primary Examiner* — Hardikkumar D Patel

(57) ABSTRACT

The technology disclosed herein enables synchronization of routing information between at least two edge systems in an edge system cluster. In a particular embodiment, a method provides, in each of the edge systems, receiving network routing information from a plurality of routers that route outbound network traffic from the edge systems and synchronizing the network routing information between the edge systems. Additionally, in each of the edge systems, the method provides receiving outbound network traffic via a logical router spanning the edge systems and routing the outbound network traffic from the edge systems in accordance with the network routing information after synchronization.

20 Claims, 5 Drawing Sheets

(51) Int. Cl.
     *H04L 12/775*  (2013.01)
     *H04L 12/773*  (2013.01)
     *H04L 12/701*  (2013.01)
     *H04L 12/741*  (2013.01)
     *H04L 12/54*   (2013.01)
     *H04L 12/931*  (2013.01)
     *H04L 12/66*   (2006.01)

(52) U.S. Cl.
     CPC .............. *H04L 12/56* (2013.01); *H04L 12/66* (2013.01); *H04L 45/00* (2013.01); *H04L 45/58* (2013.01); *H04L 45/60* (2013.01); *H04L 45/74* (2013.01); *H04L 49/70* (2013.01); *H04L 67/00* (2013.01)

(58) Field of Classification Search
     CPC ............... H04L 12/4633; H04L 45/742; H04L 41/5041; H04L 69/321; H04L 12/4654; H04L 45/306; H04L 67/2842; H04L 29/06; H04L 12/721; H04L 12/751; H04L 65/1069; H04L 45/72; H04L 12/4641; G06F 15/173
     See application file for complete search history.

(56) References Cited

U.S. PATENT DOCUMENTS

| | | | |
|---|---|---|---|
| 2013/0272310 A1* | 10/2013 | Suzuki | H04L 45/04 370/392 |
| 2016/0105471 A1* | 4/2016 | Nunes | H04L 12/4633 709/228 |
| 2017/0237710 A1* | 8/2017 | Mayya | H04L 45/64 726/13 |

* cited by examiner

US 10,389,463 B2

SYNCHRONIZATION OF ROUTING INFORMATION IN AN EDGE SYSTEM CLUSTER

TECHNICAL BACKGROUND

Routing outbound network traffic from a logical router to multiple active edge systems requires that each edge system learn the same routing information at substantially the same time. Having the same routing information allows the logical router to route network traffic to any one edge system without needing to consider whether that edge system has the routing information necessary to properly route the network traffic. If a first edge system does not receive routing information that is received by another edge system, then the first edge system cannot route network traffic that requires the not-received routing information. That network traffic therefore gets stopped at the first edge system and never makes it to its intended destination.

Communication protocols exist that allow edge systems to all receive routing information concurrently. The Border Gateway Protocol (BGP) runs on Internet Protocol and allows IP network routers to advertise routing information to connected peers (e.g., edge systems). While BGP does a good job of ensuring routing information is distributed, situations may arise where BGP communications are disrupted with one or more edge systems. Any routing information that changes and is advertised during that disruption is not received by the affected edge systems, which can cause the routing issues mentioned above.

SUMMARY

The technology disclosed herein enables synchronization of routing information between at least two edge systems in an edge system cluster. In a particular embodiment, a method provides, in each of the edge systems, receiving network routing information from a plurality of routers that route outbound network traffic from the edge systems and synchronizing the network routing information between the edge systems. Additionally, in each of the edge systems, the method provides receiving outbound network traffic via a logical router spanning the edge systems and routing the outbound network traffic from the edge systems in accordance with the network routing information after synchronization.

In some embodiments, receiving the network routing information comprises, in each of the edge systems, receiving a plurality of routing prefixes advertised by the plurality of routers, possibly over an External Border Gateway Protocol (EBGP) session with at least one of the plurality of routers. In those embodiments synchronizing the network routing information may comprise, in each of the edge systems receiving the routing prefixes from one or more of the other edge systems and updating a routing table using the routing prefixes. Also, in those embodiments updating the routing table may comprise adding a routing prefix to the routing table when the routing prefix is not already in the routing table.

In some embodiments, synchronizing the network routing information comprises establishing an Interior Border Gateway Protocol (IBGP) session between the edge systems. In those embodiments, each of the edge systems may comprise a perimeter logical router-service router (PLR-SR) between which the IBGP sessions are established. Also, in those embodiments, at least one PLR-SR of the PLR-SRs may have an Internet Protocol (IP) address in a subnet of an uplink of the at least one PLR-SR. Moreover, in some embodiments, synchronizing the network routing information may further comprise enabling Open Shortest Path First (OSPF) on uplinks of the edge systems and redistributing OSPF into IBGP.

In some embodiments, the edge systems comprise virtualized computing elements executing on a plurality of host computing systems.

In another embodiment, an apparatus is provided for synchronizing routing information between at least two edge systems in an edge system cluster. The apparatus comprises a logical router spanning the edge systems and configured to distribute network traffic between the edge systems. The apparatus further comprises the edge systems each configured to receive network routing information from a plurality of routers that route outbound network traffic from the edge systems, synchronize the network routing information between the edge systems, receive outbound network traffic via the logical router, and route the outbound network traffic from the edge systems in accordance with the network routing information after synchronization.

DETAILED DESCRIPTION

The implementations provided herein allow for the synchronization of routing information between edge systems of an edge system cluster. Edge systems in an edge system cluster operate as ingress and egress points for network traffic to a communication network. This disclosure focuses on the egress of outbound network traffic from the edge systems of an edge system cluster. In particular, to transfer traffic out of the communication network, the edge systems direct network using network addresses, such as Internet Protocol (IP) addresses, that are identified by the network traffic. IP addresses are logically divided into a routing prefix and a host identifier. Network routers in communication with the edge systems advertise routing prefixes handled by each router. The edge systems receive those routing prefixes and, responsively, know to which router(s) network traffic should be transferred based on the routing prefix(es) of the network traffic.

In an edge system cluster where multiple edge systems therein are active and connected to multiple routers, each of those multiple edge systems needs to be aware of the network prefixes advertised by each router. With the edge systems having such knowledge, network traffic can be routed via any one of the multiple edge systems. If for some reason an edge system is unaware of a network prefix handled by a router, then network traffic having that network prefix may become stuck at the edge system. Accordingly, the edge systems herein synchronize routing prefixes to ensure all edge systems are aware of each router's advertised routing prefixes.

Figure 1:
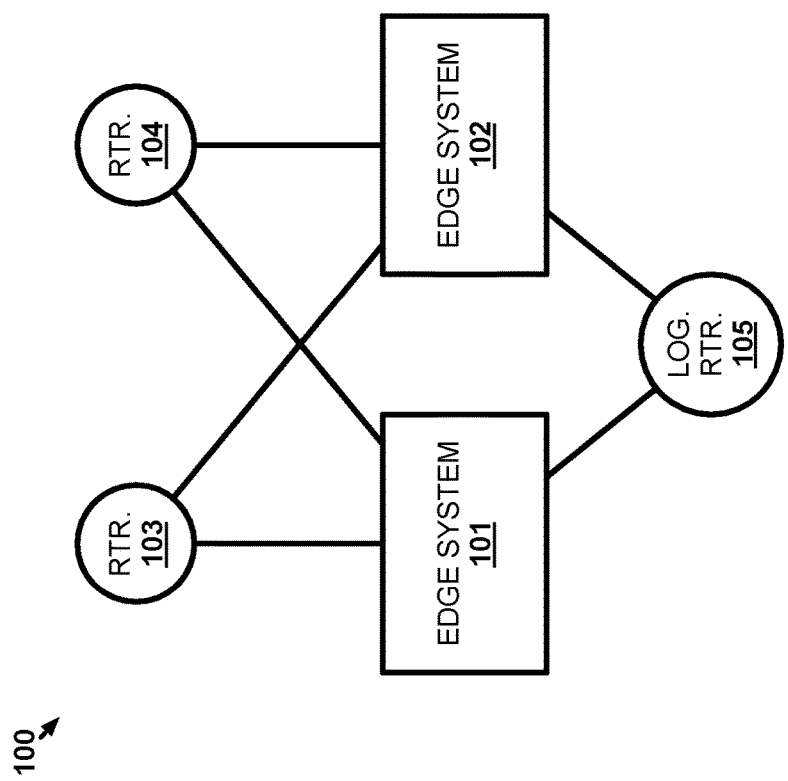
FIG. 1 illustrates a computing environment for synchronizing routing information between network edge systems.

FIG. 1 illustrates computing environment 100 for synchronizing routing information between network edge systems. Computing environment 100 includes network edge system 101, network edge system 102, network router 103, network router 104, and logical router 105. Network edge system 101 and network edge system 102 communicate with network router 103 and network router 104 over physical communication links. Network edge system 101 and network edge system 102 communicate with logical router 105 over logical communication links, which may be implemented, at least in part, over one or more physical communication links. Network edge system 101 and network edge system 102 may be implemented in physical networked computing systems with physical computing resources, such as processing resources, network interface(s), or some other type of hardware components necessary to operate as described herein. Alternatively, network edge system 101 and network edge system 102 may be implemented as virtualized elements (e.g., virtual machines, containers, etc.) with virtualized computing resources executing on physical host systems having the physical computing resources to which the virtualized computing resources are mapped.

In operation, network router 103 and network router 104 comprise physical layer 3 (L3; network layer) routers in the Open Systems Interconnection model (OSI model). L3 routing uses network addresses assigned to various networked elements (e.g., systems, devices, routers, etc.) to know where packets of network traffic should be routed. Network edge system 101 and network edge system 102 comprise an edge system cluster that facilitates the ingress and egress of network traffic from a logical network to network router 103 and network router 104. Routing within the logical network between network edge system 101, network edge system 102, and any other networked computing systems (not shown) is handled by logical router 105. Thus, logical router 105 routes network traffic directed out of the logical network to one or both of network edge system 101 and network edge system 102. Network edge system 101 and network edge system 102 responsively pass the network traffic to network router 103 and/or network router 104 depending on the destination network address of the network traffic. That is, the network traffic is passed to the network router that serves the routing prefix indicated by the destination network address. Of course, if either network edge system 101 or network edge system 102 is not aware of the routing prefix, then the traffic may never get passed to a network router. Thus, method 200 below reduces the possibility of traffic getting stuck in network edge system 101 or network edge system 102 due to routing prefixes not being known to one edge system or the other.

Figure 2:
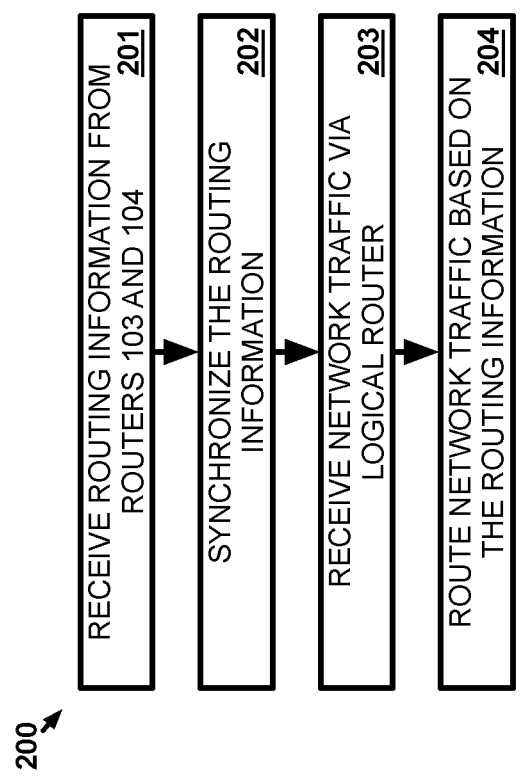
FIG. 2 illustrates a method of operating the computing environment to synchronize routing information between network edge systems.

FIG. 2 illustrates method 200 of operating computing environment 100 to synchronize routing information between network edge systems. Method 200 provides, in each of network edge system 101 and 102, receiving network routing information from network router 103 and network router 104 that route outbound network traffic (201). The network routing information may include routing prefixes, as discussed above, although L3 protocols other than IP may use different types of routing information to indicate network addresses served by a particular network router. Likewise, in IP, network edge system 101 and network edge system 102 receive the routing information when network router 103 and network router 104 advertise routing prefixes over network links to connected elements, although other L3 protocols may use different mechanisms to provide routing information.

After receiving the routing information, method 200 provides synchronizing the network routing information between network edge system 101 and network edge system 102 (202). This synchronization ensures that both network edge system 101 and network edge system 102 use the same routing information. For example, network edge system 101 may not have received a portion of the routing information from network router 104. Assuming network edge system 102 did receive that portion, synchronizing the routing information between network edge system 101 and network edge system 102 allows network edge system 102 to provide the not-received portion of the routing information to network edge system 101. The synchronization of routing information not only adds routing information that an edge system may not have received, it also removes, or otherwise makes changes to, routing information based on the routing information received from network router 103 and network router 104.

Method 200 further provides network edge system 101 and network edge system 102 receiving network traffic via logical router 105 (203). The network traffic is destined for a network external to the logical network services by logical router 105 where the network traffic originated. Accordingly, method 200 provides network edge system 101 and network edge system 102 routing the outbound network traffic in accordance with the network routing information after synchronization (204). Thus, regardless of whether the routing information was received from network router 103 and network router 104 or during the synchronization process, the outbound network traffic is passed by network edge system 101 or network edge system 102 based on that routing information. For example, if network edge system 101 did not receive routing information applicable to only network router 103 but network edge system 102 did receive that routing information, network edge system 101 receives that routing information from network edge system 102 anyway during the synchronization of routing information. As such, network edge system 101 can still properly direct applicable network traffic to network edge system 101 based on the synchronized routing information rather than the network traffic getting stuck in network edge system 101 due to network edge system 101 not knowing where to route the traffic.

Figure 3:
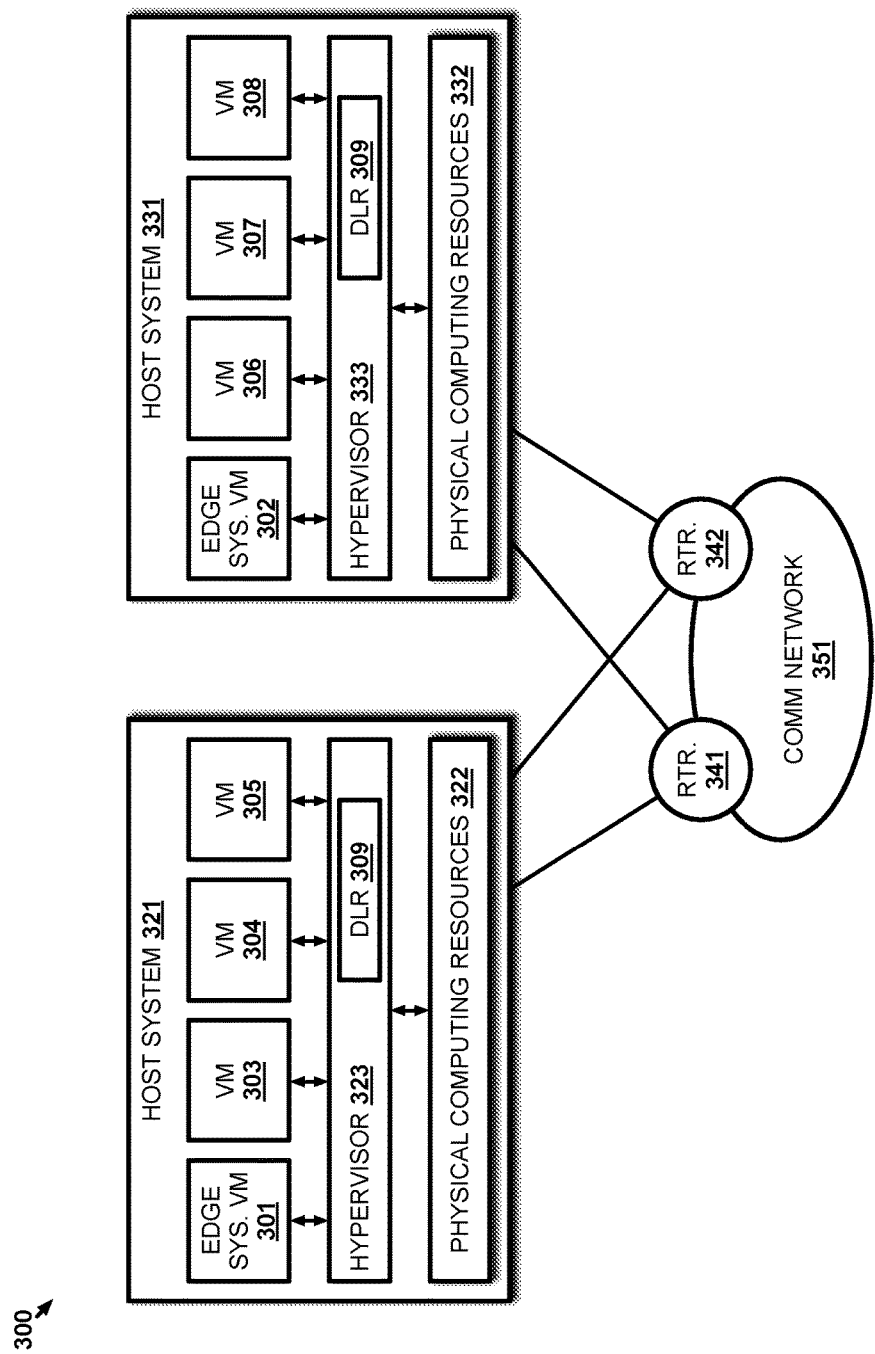
FIG. 3 illustrates another computing environment for synchronizing routing information between network edge systems.

FIG. 3 illustrates computing environment 300 for synchronizing routing information between network edge systems. Computing environment 300 includes host computing system 321, host computing system 331, and communication network 351 of which network router 341 and network router 342 are a part. In this example, network router 341 and network router 342 comprise L3 IP routers that route communications between various IP sub-networks that comprise communication network 351. Communication network 351 may include the Internet, one or more local area networks, and/or one or more wide area networks.

In this example, host computing system 321 executes hypervisor 323 to allocate physical computing resources 322 among virtual machines 301 and 303-305. Likewise, host computing system 331 executes hypervisor 333 to allocate physical computing resources 332 among virtual machines 302 and 306-208. Physical computing resources 322 and 332 may include processing resources (e.g., CPU time/cores), memory space, network interfaces, user interfaces, or any other type of resource that a physical computing system may include. An instance of distributed logical router 309 is executing in each hypervisor 323 and hypervisor 333. The instances of distributed logical router 309 communicate with each other across host computing system 321 and host computing system 331 to act as a single logical router implementing a logical network connecting virtual machines 301-308. Virtual machines 301 and 302 implement edge systems, similar to network edge system 101 and network edge system 102, through which network traffic between communication network 351 and virtual machines 303-308 is routed.

It should be understood that the distribution of virtual machines evenly across two host computing systems, as shown in FIG. 3, is merely exemplary. The eight virtual machines shown may instead be implemented on any number of host computing systems from one to eight. Likewise, host computing systems 321 and 331 could host additional hosts and virtual machines and/or other virtual elements that are not involved in this example.

Figure 4:
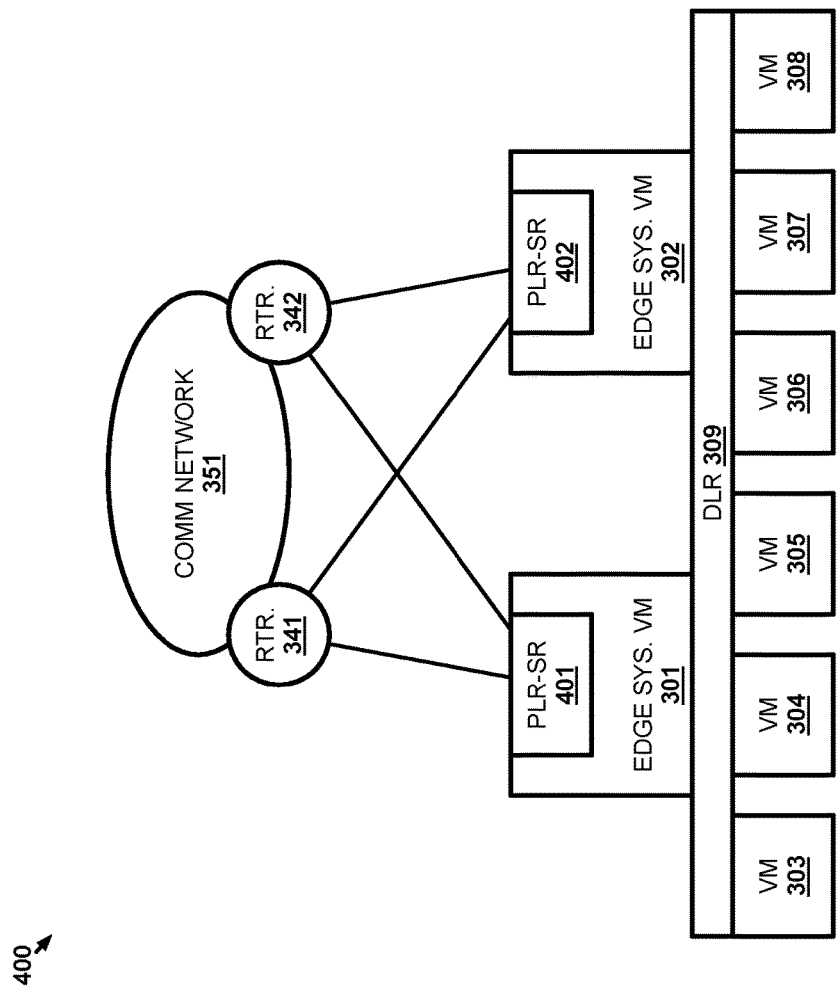
FIG. 4 illustrates a logical arrangement of the other computing environment to synchronize routing information between network edge systems.

FIG. 4 illustrates logical arrangement 400 of computing environment 300 to synchronize routing information between network edge systems. In the expanded view that logical arrangement 400 affords, it is shown that edge system VM 301 includes perimeter logical router—service router (PLR-SR) 401 and edge system VM 302 includes PLR-SR 402. PLR-SR 401 and PLR-SR 402 are elements of edge system VM 301 and edge system VM 302 that handle the routing of network traffic between communication network 351 and the logical network of distributed logical router 309. Though not discussed, edge system VM 301 and edge system VM 302, outside of PLR-SR 401 and PLR-SR 402, may perform other functions on the network traffic, such as firewall functions to protect systems on the logical network of distributed logical router 309.

In this example, like the example of computing environment 100, the edge system cluster includes only two active edge systems, edge system VM 301 and edge system VM 302. However, it should be understood that more than two edge systems may be included in an edge system cluster. Those additional edge systems would synchronize routing information amongst themselves and with edge system VM 301 and edge system VM 302 in the same manner described below. Likewise, only two L3 routers are used in this example, network router 341 and network router 342, although more than two network routers may be used and connected to PLR-SR 401 and PLR-SR 402 in other examples. In logical arrangement 400, PLR-SR 401 and PLR-SR 402 are both connected to network router 341 and network router 342 to exchange network traffic with communication network 351.

Figure 5:
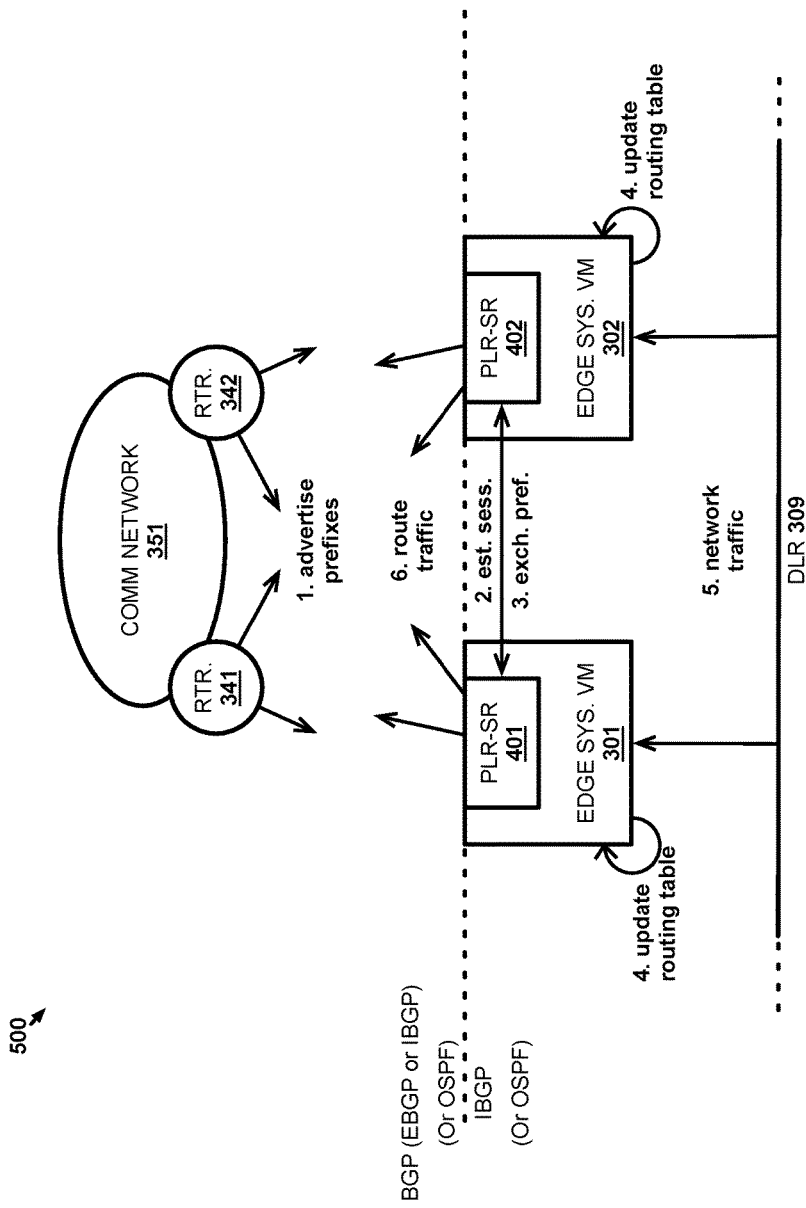
FIG. 5 illustrates an operational scenario of the other computing environment to synchronize routing information between network edge systems.

FIG. 5 illustrates operational scenario 500 of computing environment 300, based on logical arrangement 400, to synchronize routing information between network edge systems. Scenario 500 relies on the Border Gateway Protocol (BGP) to exchange routing information between various elements, as described below, but it should be understood that other examples may use other protocols. BGP is a protocol for exchanging routing and reachability information in a network. External BGP (EBGP) exchanges such information between autonomous systems on a larger network, such as communication network 351. In this example, edge system VM 301 and edge system VM 302 are edge systems of a single autonomous system networked by distributed logical router 309. Additionally, network router 341 and network router 342 comprise EBGP peers of PLR-SR 401 and PLR-SR 402 because they handle the routing of network traffic between autonomous systems (e.g., from the autonomous system of edge system VM 301 and edge system VM 302 to another autonomous system on communication network 351. PLR-SR 401 and PLR-SR 402 each have a separate router ID that is elected by default based on their respective uplink IP addresses with network router 341 and network router 342. Similarly, Internal BGP (IBGP) is used to exchange routing and reachability information between systems internal to autonomous systems. Thus, in this example, PLR-SR 401 and PLR-SR 402 to exchange routing and reachability information since they are part of a single autonomous system.

In scenario 500, network router 341 and network router 342 both advertise, at step 1, IP routing prefixes that are handled by each respective router. The routing prefixes are advertised using EBGP to all EBGP peers, which includes PLR-SR 401 and PLR-SR 402. Anytime a new route is identified by one of network router 341 and network router 342 (e.g., a new subnet in communication network 351), a routing prefix for that new route is advertised so that all EBGP peers can make use of that new route when transferring network traffic. Since PLR-SR 401 and PLR-SR 402 are EBGP peers of network router 341 and network router 342, PLR-SR 401 and PLR-SR 402 receive the advertised routing prefixes and update their respective routing tables accordingly.

Additionally, an IBGP session is established between PLR-SR 401 and PLR-SR 402 at step 2 to facilitate the exchange of routing information between PLR-SR 401 and PLR-SR 402. Typically, IBGP is used to exchange information for routing traffic internally to an autonomous system (e.g., for routing network traffic over distributed logical router 309). However, in this example, the IBGP session is established to exchange the routing prefixes learned by each of PLR-SR 401 and PLR-SR 402 at step 3. In particular, an IBGP session is formed on a separate interface and uses internal network addresses dedicated for inter-SR routing. Also, northbound BGP routes, user configured static routes, and the connected routes are redistributed to IBGP peer (i.e., to other PLR-SRs). The redistribution is performed by setting the NO-EXPORT community for the routing prefixes injected into the PLR-SR IBGP peers (PLR-SRs 401 and 402 in this example). In cases where the northbound protocol with network routers 341 and 342 is OSPF, or some other protocol, those protocol communications with be redistributed to IBGP. Accordingly, Both PLR-SR 401 and PLR-SR 402 update their respective routing tables at step 4 based on the exchanged routing prefixes. Ideally, since both PLR-SR 401 and PLR-SR 402 are EBGP peers of network router 341 and network router 342, the routing prefixes stored in each of PLR-SR 401 and PLR-SR 402's routing tables should be identical. Therefore, updating their respective routing tables may simply comprise confirming that all routing prefixes that were exchanges are already accounted for in the respective routing tables of PLR-SR 401 and PLR-SR 402.

Unfortunately, circumstances may exist where the routing tables end up differing. For example, PLR-SR 402 may lose its EBGP connection with network router 341 for a time and network router 341 may advertise new routing prefixes during that time. PLR-SR 402 would not receive those new routing prefixes while the EBGP connection is down. However, PLR-SR 401 maintains its EBGP connection with network router 341 and does receive the new routing prefixes. Those new routing prefixes are transferred to PLR-SR 402 over the IBGP session with PLR-SR 401. Upon receiving the new routing prefixes, PLR-SR 402 determines that the new routing prefixes are not already in its routing table and updates its routing table with the new routing prefixes accordingly. In some examples, even if the new routing prefixes are already in PLR-SR 402's routing table as the best route, the new routing prefixes may be kept for fallback purposes.

Distributed logical router 309 distributes network traffic originating in VMs 303-308 to edge system VM 301 and edge system VM 302 at step 5. Since both edge system VM 301 and edge system VM 302 are active edge systems, it does not matter which edge system distributed logical router 309 routes certain network traffic through. However, distributed logical router 309 likely uses some logic to balance the network traffic load between edge system VM 301 and edge system VM 302. Regardless, upon receiving the network traffic in edge system VM 301 and edge system VM 302, PLR-SR 401 and PLR-SR 402 route that traffic to one of network router 341 and network router 342 in accordance with their respective routing tables. That is, if a portion of the network traffic is directed to a particular subnet based on a routing prefix in an IP address of the portion, then PLR-SR 401 and PLR-SR 402 will route the portion to whichever router handles traffic having that routing prefix.

Referring back to the example above where PLR-SR 402 did not receive the new routing prefixes from network router 341, any network traffic from distributed logical router 309 that is directed to one of those new routing prefixes would be stopped at PLR-SR 402. Without the new routing prefixes being added to PLR-SR 402's routing table, PLR-SR 402 has no idea where to route that network traffic. However, since scenario 500 allowed PLR-SR 402 to receive the new routing prefixes from PLR-SR 401, PLR-SR 402 can route the network traffic in the same way it would have had PLR-SR 402 received the routing prefixes from network router 341 directly.

In an alternative version of scenario 500, Open Shortest Path First (OSPF) may be used instead of IBGP to exchange the routing prefixes between PLR-SR 401 and PLR-SR 402. OSPF is a protocol that operates directly on IP rather than using a transport protocol, as does BGP, and effectively creates a communication mesh network between nodes of an autonomous system. As such, OSPF is an alternative protocol to IBGP for exchanging communications within an autonomous system. In this alternative of scenario 500, OSPF is running on an interface and internal network addresses dedicated for inter-SR routing. The northbound BGP, user configured static routes, and connected routes mentioned in the example above will be redistributed into OSPF to other PLR-SRs (i.e., from PLR-SR 401 to PLR-SR 402 and vice versa). The northbound protocol with network routers 341 and 342 is OSPF with the interfaces for inter-SR routing comprising an internal OSPF stub area. Since OSPF creates a mesh between nodes in an autonomous system, any routing information received by PLR-SR 401 is also passed to PLR-SR 402. Thus, even if, for example, PLR-SR 402 is unable to receive new routing prefixes from network router 341 directly, the OSPF mesh allows PLR-SR 402 to receive those routing prefixes by way of PLR-SR 401.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of synchronizing routing information between edge systems in an edge system cluster, the method comprising:
   in each of the edge systems, receiving first network routing information transmitted, in a first protocol for transferring routing information, from each of a plurality of routers that route outbound network traffic from the edge systems;
   in a second edge system of the edge systems, receiving second routing information transmitted, in the first protocol, from one or more routers of the plurality of routers,
      wherein a first edge system of the edge systems does not have connectivity in the first protocol to the one or more routers when the second routing information is transmitted and does not receive the second routing information from the one or more routers;
   synchronizing the second network routing information between the edge systems such that the first edge system receives the second routing information from the second edge system;
   after synchronizing the second network routing information, in the first edge system, receiving outbound network traffic via a logical router spanning the edge systems, wherein the second routing information applies to the outbound network traffic; and
   routing the outbound network traffic from the first edge system to a router of the one or more routers in accordance with the second network routing information.

2. The method of claim 1, wherein the second network routing information comprises a plurality of routing prefixes advertised by the plurality of routers.

3. The method of claim 2, wherein synchronizing the second network routing information comprises:
   in the first edge system:
      receiving the plurality of routing prefixes from the second edge system; and
      updating a routing table of the first edge system using the plurality of routing prefixes.

4. The method of claim 3, wherein updating the routing table comprises:
   adding a routing prefix to the routing table when the routing prefix is not already in the routing table.

5. The method of claim 2, wherein receiving the second network information comprises:
   receiving the plurality of routing prefixes over an External Border Gateway Protocol (EBGP) session with at least one of the plurality of routers.

6. The method of claim 1, wherein synchronizing the second network routing information comprises:
   establishing an Interior Border Gateway Protocol (IBGP) session between the edge systems.

7. The method of claim 6, wherein each of the edge systems comprises a perimeter logical router-service router (PLR-SR) between which the IBGP session is established.

8. The method of claim 7, wherein at least one PLR-SR of the PLR-SRs has an Internet Protocol (IP) address in a subnet of an uplink of the at least one PLR-SR.

9. The method of claim 6, wherein synchronizing the network routing information further comprises:
   enabling Open Shortest Path First (OSPF) on uplinks of the edge systems; and
   redistributing OSPF into IBGP.

10. The method of claim 1, wherein the edge systems comprise virtualized computing elements executing on a plurality of host computing systems.

11. A system for synchronizing routing information between edge systems in an edge system cluster, the system comprising:
  a logical router spanning the edge systems and configured to distribute network traffic between the edge systems comprising at least a first and second edge system, wherein each edge system resides on a corresponding host computing system that comprises physical computing resources; wherein:
    the edge systems are configured to receive first network routing information transmitted, in a first protocol for transferring routing information, from each of a plurality of routers that route outbound network traffic from the edge systems;
    the second edge system is configured to receive second routing information transmitted, in the first protocol, from one or more routers of the plurality of routers,
    the first edge system of the edge systems does not have connectivity in the first protocol to the one or more routers when the second routing information is transmitted and does not receive the second routing information from the one or more routers;
    the edge systems are further configured to synchronize the second network routing information between the edge systems such that the first edge system receives the second routing information from the second edge system; and
    the first edge system is configured to, after the second network routing information is synchronized, receive outbound network traffic via the logical router, wherein the second routing information applies to the outbound network traffic, and route the outbound network traffic from the first edge system to a router of the one or more routers in accordance with the second network routing information.

12. The system of claim 11, wherein the second network routing information comprises a plurality of routing prefixes advertised by the plurality of routers.

13. The system of claim 12, wherein to synchronize the second network routing information:
  the first edge system is configured to receive the plurality of routing prefixes from the second edge system and update a routing table of the first edge system using the plurality of routing prefixes.

14. The system of claim 13, wherein to update the routing table:
  the first edge system is configured to add a routing prefix to the routing table when the routing prefix is not already in the routing table.

15. The system of claim 12, wherein to receive the second network information:
  the edge systems are configured to receive the plurality of routing prefixes over an External Border Gateway Protocol (EBGP) session with at least one of the plurality of routers.

16. The system of claim 11, wherein to synchronize the network routing information:
  the edge systems are configured to establish an Interior Border Gateway Protocol (IBGP) session between the edge systems.

17. The system of claim 16, wherein each of the edge systems comprises a perimeter logical router-service router (PLR-SR) between which the IBGP session is established.

18. The system of claim 17, wherein at least one PLR-SR of the PLR-SRs has an Internet Protocol (IP) address in a subnet of an uplink of the at least one PLR-SR.

19. The system of claim 16, wherein to synchronize the network routing information:
  the edge systems are configured to enable Open Shortest Path First (OSPF) on uplinks of the edge systems and redistribute redistributing OSPF into IBGP.

20. The system of claim 11, wherein the edge systems comprise virtualized computing elements executing on a plurality of host computing systems.

* * * * *